US007284773B2

(12) United States Patent
Curry et al.

(10) Patent No.: US 7,284,773 B2
(45) Date of Patent: Oct. 23, 2007

(54) QUICK DISCONNECT WITH RETAINING SPRING

(75) Inventors: Brian D. Curry, Doylestown, PA (US); Harry W. Hartman, Harleysville, PA (US); Frederick J. Ellingson, Chalfont, PA (US)

(73) Assignee: Triumph Controls, Inc., North Wales, PA (US)

( * ) Notice: Subject to any disclaimer, the term of this patent is extended or adjusted under 35 U.S.C. 154(b) by 193 days.

(21) Appl. No.: 10/922,538

(22) Filed: Aug. 20, 2004

(65) Prior Publication Data

US 2005/0048827 A1 Mar. 3, 2005

Related U.S. Application Data

(60) Provisional application No. 60/499,166, filed on Aug. 29, 2003.

(51) Int. Cl.
*F16L 39/00* (2006.01)

(52) U.S. Cl. ....................... 285/317; 285/315; 285/316

(58) Field of Classification Search ................ 285/320, 285/35, 33, 34, 314, 315, 316, 331, 304, 285/326, 920, 921, 324, 322, 317, 313; 403/325, 403/326; 14/22; 439/180, 310, 319, 345, 439/578, 239; 24/68, 71, 68 R; 52/122.1; 114/199; 248/49; 376/342; 958/59, 78; 367/59, 78.1; 279/37; 464/52
See application file for complete search history.

(56) References Cited

U.S. PATENT DOCUMENTS

| | | | | |
|---|---|---|---|---|
| 2,333,423 A | | 11/1943 | Hufferd | |
| 2,425,992 A | * | 8/1947 | Cadwallader | 464/52 |
| 2,439,275 A | | 4/1948 | Spotz | |
| 2,448,817 A | * | 9/1948 | McArthur | 403/321 |
| 2,490,580 A | | 12/1949 | Colla, Jr. | |
| 3,116,943 A | | 1/1964 | Wagner | |
| 3,171,183 A | * | 3/1965 | Johnston | 24/635 |
| 3,220,757 A | * | 11/1965 | Potter | 403/340 |
| 3,278,205 A | | 10/1966 | Barlow | |
| 3,527,480 A | | 9/1970 | Larson | |
| 3,590,862 A | | 7/1971 | De Graaf | |
| 3,606,244 A | | 9/1971 | Nusbaum | |
| 3,664,375 A | | 5/1972 | Marette | |
| 3,897,091 A | | 7/1975 | McMath et al. | |

(Continued)

FOREIGN PATENT DOCUMENTS

EP 0975064 A2 1/2000

*Primary Examiner*—Aaron Dunwoody
*Assistant Examiner*—Jay R. Ripley
(74) *Attorney, Agent, or Firm*—Niels Haun; Dann, Dorfman, Herrell & Skillman, PC

(57) ABSTRACT

A quick disconnect is provided to permit two cable ends to be rapidly connected and disconnected without the use of tools. The quick disconnect includes rear and front couplings which may be mounted to respective cable ends. Quick connection of the cable ends is effected by connecting the rear and front couplings to one another by a hinge latch. The hinge latch is retained in the closed position by a compression sleeve which surrounds the hinge latch. The front end of the compression sleeve includes a ring groove that retains a ring spring. The ring spring engages complementary retention grooves in the hinge latch to bias the hinge latch in the closed position, thus securing the front coupling to the rear coupling.

14 Claims, 2 Drawing Sheets

U.S. PATENT DOCUMENTS

| | | | | |
|---|---|---|---|---|
| 4,030,524 | A | | 6/1977 | Mc Math et al. |
| 4,090,524 | A | | 5/1978 | Allread et al. |
| 4,102,356 | A | | 7/1978 | Knight |
| 4,135,551 | A | | 1/1979 | Knight et al. |
| 4,138,181 | A | | 2/1979 | Hacker et al. |
| 4,234,161 | A | | 11/1980 | Wilder et al. |
| 4,271,865 | A | | 6/1981 | Galloway et al. |
| 4,359,066 | A | | 11/1982 | Hunt |
| 4,392,513 | A | | 7/1983 | Parrish |
| 4,515,182 | A | | 5/1985 | Ledevehat |
| 4,846,714 | A | | 7/1989 | Welsby |
| 4,919,627 | A | * | 4/1990 | Cable ......................... 439/263 |
| 4,941,846 | A | | 7/1990 | Guimond |
| 5,078,170 | A | | 1/1992 | Henry |
| 5,090,449 | A | | 2/1992 | Fournier et al. |
| 5,129,621 | A | | 7/1992 | Maiville et al. |
| 5,273,071 | A | | 12/1993 | Oberrecht |
| 5,316,347 | A | | 5/1994 | Arosio |
| 5,439,235 | A | * | 8/1995 | Blackwell .................. 279/2.15 |
| 5,595,217 | A | | 1/1997 | Gillen et al. |
| 5,615,707 | A | | 4/1997 | Pfannenschmidt |
| 5,628,344 | A | | 5/1997 | Roberts |
| 5,671,777 | A | | 9/1997 | Allen et al. |
| 6,155,294 | A | | 12/2000 | Cornford et al. |
| 6,298,876 | B1 | | 10/2001 | Bogdonoff et al. |

* cited by examiner

QUICK DISCONNECT WITH RETAINING SPRING

RELATED APPLICATIONS

This application claims the benefit of priority of U.S. Provisional Application 60/499,166, filed on Aug. 29, 2003. The entire contents of the above-referenced application(s) are incorporated herein by reference.

FIELD OF THE INVENTION

The present invention relates generally to a quick disconnect which may be used to connect two couplers and in particular, but not exclusively, to a quick disconnect having a ring spring for engagement with a hinge latch to bias the hinge latched in the closed position.

BACKGROUND OF THE INVENTION

Presently, many applications exist in which the ability to quickly connect and disconnect two cable ends is desirable. For example, in many systems, such as aircraft, marine and automobile engine controls, the ability to quickly and reliably connect and disconnect to cable ends is desirable in order to service, inspect or replace the cable inner core.

However, existing quick connects that incorporate a compression sleeve often require that the tolerances of the inside diameter of the compression sleeve be precisely controlled. Such precision can lead to an increased manufacturing cost. In addition, as the quick disconnect is repeatedly used, the precise dimensions may change and no longer be within the desired tolerances, due to wear of the components with use. Accordingly, it would be in advance in the state-of-the-art to provide a quick disconnect that is less susceptible to changes in performance with repeated use due to component wear. In addition, it would be in advance to provide a quick disconnect having a design that provides positive feedback to an operator, such as tactile feedback provided by a "click", when the quick disconnect is assembled into its final, closed state.

SUMMARY OF THE INVENTION

In accordance with the present invention, a quick disconnect is provided for rapidly connecting two members together, such as two cable ends, without the need for tools. The quick disconnect includes a front coupling and a rear coupling each for connection to a respective cable end. The quick disconnect further includes a hinge latch that has at least one finger pivotally mounted at a first end of the rear coupling. The finger may include a retention groove or a depression disposed at a second end and may include a coupling groove for receiving the front coupling. A compression sleeve is also provided and is slidably disposed over the hinge latch to retain the compression sleeve in the closed, latched position. In addition, the quick disconnect includes a biasing member disposed at a first end of the compression sleeve for engagement with the retention groove of the finger to retain the latch in the closed position about the front coupling. The biasing member may be provided in the form of a spring, such as a ring spring.

BRIEF DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
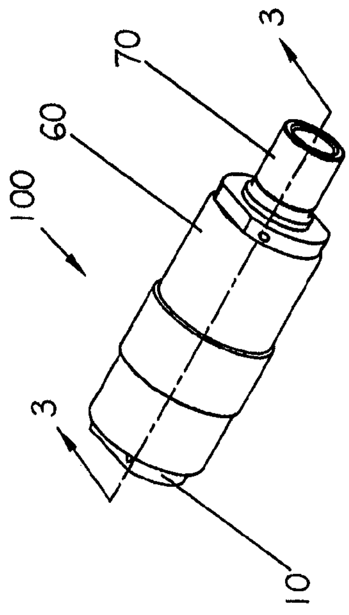
FIG. 1 schematically illustrates a perspective view of a quick disconnect according to the present invention.

Referring to the figures, wherein like reference numerals refer to like elements throughout, a quick disconnect in accordance with the present invention, generally designated 100, is illustrated. The quick disconnect 100 permits two cable ends to be rapidly connected and disconnected without the use of tools. The quick disconnect 100 includes rear and front couplings 10, 70 which may be mounted to respective cable ends. Quick connection of the cable ends is effected by connecting the rear and front couplings 10, 70 to one another by a hinge latch 20. The hinge latch 20 is retained in the closed position by a compression sleeve 40 which surrounds the hinge latch 20. In this regard, the front end 46 of the compression sleeve 40 includes a ring groove 43 that retains a ring spring 50. The ring spring 50 engages complementary retention grooves 24 in the hinge latch 20 to bias the hinge latch 20 in the closed position, thus securing the front coupling 70 to the rear coupling 10.

Figure 2:
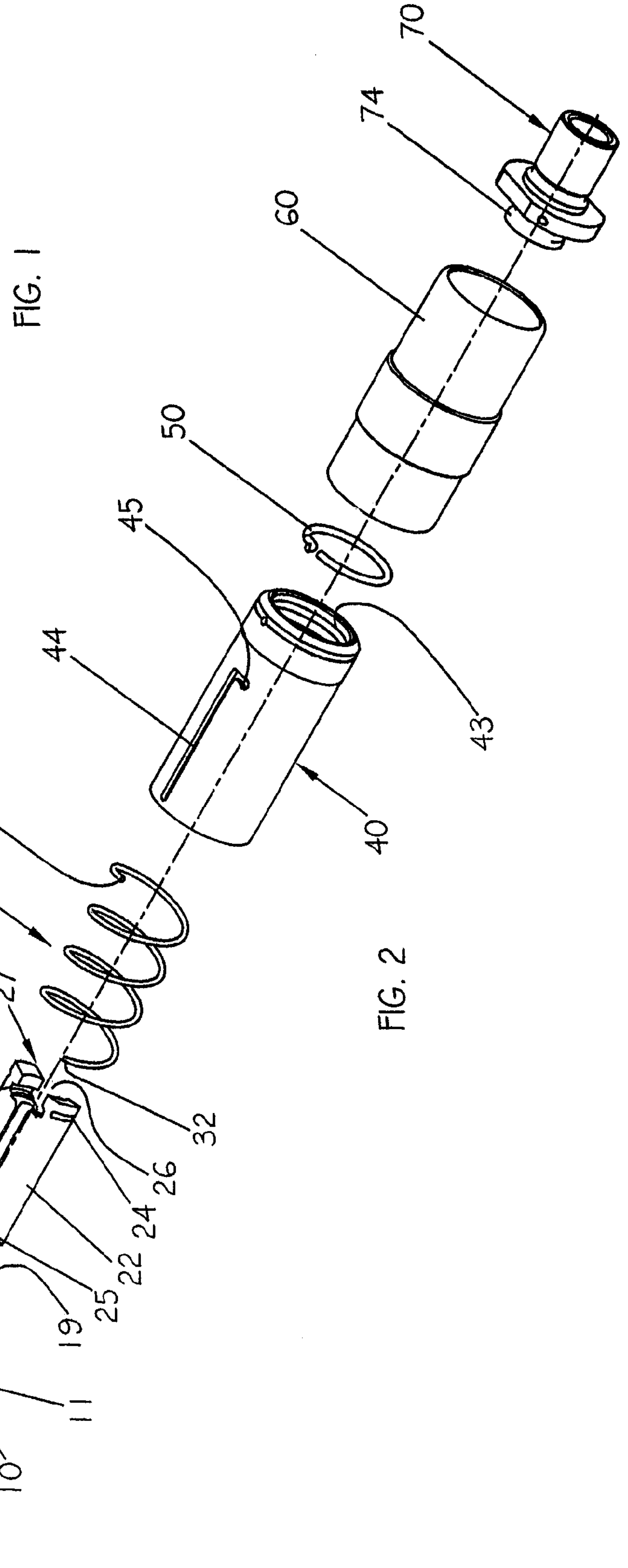
FIG. 2 schematically illustrates an exploded view of the quick disconnect of FIG. 1.
Figure 3:
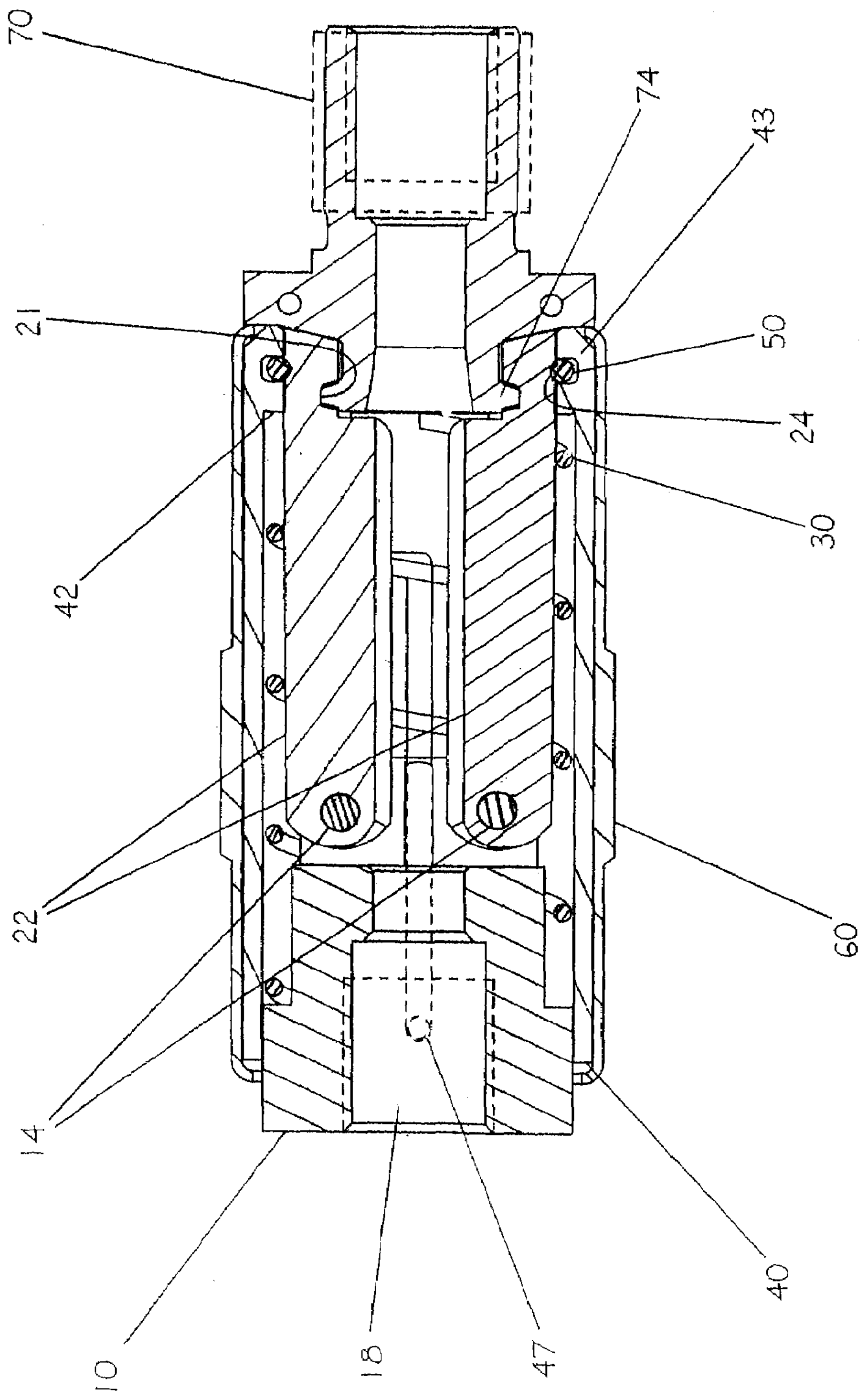
FIG. 3 schematically illustrates a cross-sectional view of the quick disconnect of FIGS. 1 and 2 taken along the section line 3-3 in FIG. 1.

Turning now to the Figures, in particular FIGS. 2 and 3, a quick disconnect 100 in accordance with the present invention is illustrated. The quick disconnect 100 includes a rear coupling 10 to which a first cable end may be attached. The rear coupling 10 may include an opening in a rear end 18 into which the first cable end may be inserted. The first cable end may be attached by the use of a set screw, an adhesive, welding, crimping, or other suitable means. At the front end 19 of the rear coupling 10, which opposes the rear end 18 of the rear coupling 10, a hinge latch 20 is hingedly connected to the rear coupling 10. The hinge latch 20 includes one or more fingers 22 that are pivotally connected to the rear coupling 10 at the rear end 23 of the fingers 22. While the quick disconnect 100 is shown having two pivotally mounted fingers 22, one or more pivotally mounted fingers 22 maybe utilized. For example, a quick disconnect 100 in accordance with the present invention may include one finger 22 pivotally mounted to the rear coupling 10 and one finger 22 non-pivotally mounted to the rear coupling 10. As illustrated in FIG. 2, the fingers 22 maybe attached to the rear coupling 10 by any device that permits the fingers 22 to hingedly move. For example, the fingers 22 maybe attached to the rear coupling 10 at the rear end 23 of the fingers 22 by rivets 14 that extend through holes 12 in the rear coupling 10 and through holes 25 in the fingers 22.

The quick disconnect 100 may further include a compression sleeve 40 slidably disposed over the fingers 22 to retain the hinge latch 20 in the closed position by providing a compression force against the fingers 22. In this regard, the compression sleeve 40 has a front end 46 that includes a ring groove 43 with a ring spring 50 provided in the ring groove 43 for providing the compression force against the fingers 22. Complementary retention grooves 24 for receiving the ring spring 50 may be provided on an outer surface of the fingers 22 proximate the female end 27 of the fingers 22. The compression sleeve 40 is slidably movable along the longitudinal axis of the quick disconnect 100. When the compression sleeve 40 is positioned in its extended position, so that the retention spring 50 engages the retention grooves 24 of the fingers 22, the hinge latch 20 is locked into its closed position by the compression sleeve 40.

A sleeve spring 30, such as a helical spring, is provided between the hinge latch 20 and the compression sleeve 40 for cooperation with the compression sleeve 40 to position the compression sleeve 40 in its extended position. The sleeve spring 30 is disposed over the hinge latch 20 when the sleeve spring 30 is in its substantially extended, non-compressed state. The front end 34 of the sleeve spring 30 rests against a sleeve shoulder 42 proximate a front end 46 of the compression sleeve 40, and the rear end 32 of the sleeve spring 30 rests against a shoulder 11 of the rear coupling 10. The sleeve spring 30 has a length that is selected to position the compression sleeve 40 in its extended position so that the ring spring 50 engages the retention grooves 24 of the fingers 22 when the sleeve spring 30 is extended.

The hinge latch 20 may be accessed by sliding the compression sleeve 40 towards the rear coupling 10 which causes the sleeve spring 30 to be compressed, thereby providing a biasing force between the shoulder 11 of the rear coupling 10 and the shoulder 42 of the compression sleeve 40. In particular, the compression sleeve 40 may be moved towards the rear coupling 10 a sufficient distance beyond the rear end 23 of the fingers 22 to permit the fingers 22 of the hinge latch 20 to pivot freely about the rivets 14. For example, a user may pull the compression sleeve 40 against the force of the sleeve spring 30 towards the rear coupling 10 until the front end 46 of the compression sleeve 40 clears the rear end 23 of the fingers 22 of the hinge latch 20 to place the compression sleeve 40 in its "retracted" position. When the user releases the compression sleeve 40, the sleeve spring 30 extends pushing the compression sleeve 40 away from the rear coupling 10 until the ring spring 50 of the compression sleeve 40 engages the retention grooves 24 of the fingers 22 of the hinge latch 20.

To assist the user in maintaining the compression sleeve 40 in its retracted position, the rear coupling 10 may be provided with a pin 47 for engagement with a slot 44 that extends along the longitudinal axis of the compression sleeve 40. The pin 47 may be mounted to the rear coupling 10 and may extend into the slot 44 of the compression sleeve 40. The slot 44 may include a keyway 45 that extends circumferentially relative to the longitudinal axis of the compression sleeve 40 for engagement with the pin 47. The keyway 45 is disposed at a location along the length of the compression sleeve 40 so that the pin 47 is in registration with the keyway 45 when the compression sleeve 40 is in its retracted position. When the compression sleeve 40 is in its retracted position with the pin 47 so registered, the compression sleeve 40 may be rotated so that the pin 47 enters the keyway 45 and rests against a shoulder 41 of the keyway 45 to prevent the compression sleeve 40 from returning to its extended position by action of the sleeve spring 30. Thus, the compression sleeve 40 may be temporarily locked in place in its retracted position against the biasing force of the sleeve spring 30 by action of the pin 47 against the shoulder 41 of the keyway 45.

With the compression sleeve 40 so locked in the retracted position, a user may freely manipulate the fingers 22 so as to open and close the latch 20. In particular, the user may engage a front coupling 70, to which a second cable end may be mounted in the same manner as that described above with respect to the rear coupling 10, with the hinge latch 20. In this regard, at the female end 27 of each finger 22, a flange groove 21 is provided which is dimensioned to receive a flange 74 of a front coupling 70. The user may insert the flange 74 within the flange grooves 21 of the fingers 22 and close the hinge latch 20 about the flange 74 to retain the front coupling 70 within the hinge latch 20. With the front coupling 70 so positioned within the hinge latch 20, the user may release the compression sleeve 40 from its locked retracted position so that the force of the sleeve spring 30 returns the compression sleeve 40 to its extended position where the ring spring 50 engages the retention grooves 24 of the fingers 22 to securely retain the front coupling flange 74 in the hinge latch 20, thereby connecting the rear coupling 10 to the front coupling 70.

In addition, the quick disconnect 100 may optionally be provided with an outer sleeve 60 that is dimensioned to fit over the compression sleeve 40 and to extend along the length of the quick disconnect 100. The outer sleeve 60 may be attached to the compression sleeve 40 by any suitable means, including, for example, by compression fit. The components of the quick disconnect 100 may be fabricated from metal or other suitable materials.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A quick disconnect, comprising:

a front coupling and a rear coupling each for connection to a respective cable end;

a hinge latch comprising at least one finger pivotally mounted at a first end to the rear coupling, the finger having a retention groove disposed at a second end and having a coupling groove for receiving the front coupling;

a compression sleeve slidably disposed over the hinge latch;

a ring spring affixed to a first end of the compression sleeve and movable with the compression sleeve, the ring spring for engagement with the retention groove of the finger when the sleeve is disposed in its closed position over the hinge latch.

2. The quick disconnect according to claim 1, wherein the ring spring is retained within a ring groove disposed in the compression sleeve.

3. The quick disconnect according to claim 1, wherein the hinge latch comprises a plurality of fingers pivotally mounted at a first end to the rear coupling.

4. The quick disconnect according to claim 1, comprising a sleeve spring disposed over the hinge latch.

5. The quick disconnect according to claim 1, comprising a sleeve spring disposed between the hinge latch and the compression sleeve.

6. The quick disconnect according to claim 1, comprising a pin disposed at the rear coupling, and wherein the compression sleeve comprises a slot for engaging the pin.

7. The quick disconnect according to claim 6, wherein the slot includes a keyway for retaining the pin, so that the compression sleeve is retained in a retracted position to permit the finger of the hinge latch to freely pivot.

8. A quick disconnect, comprising:

a front coupling and a rear coupling each for connection to a respective cable end;

a hinge latch comprising at least one finger pivotally mounted at a first finger end to the rear coupling, the finger having a depression disposed at a second end and having a coupling means for retaining front coupling;

a compression sleeve slidably disposed over the hinge latch; and biasing means affixed to a first end of the compression sleeve and movable with the compression sleeve, the biasing means for engagement with the depression of the finger when the sleeve is disposed in its closed position over the hinge latch to provide a biasing force to retain the hinge latch in the closed position, whereby the front coupling and rear coupling are connected together, wherein the biasing means comprises a spring.

9. The quick disconnect according to claim 8, wherein the biasing means comprises a ring spring.

10. The quick disconnect according to claim 8, wherein the hinge latch comprises a plurality of fingers pivotally mounted at a first end to the rear coupling.

11. The quick disconnect according to claim 8, comprising a sleeve spring disposed over the hinge latch.

12. The quick disconnect according to claim 8, comprising a sleeve spring disposed between the hinge latch and the compression sleeve.

13. The quick disconnect according to claim 8, comprising a pin disposed at the rear coupling, and wherein the compression sleeve comprises a slot for engaging the pin.

14. The quick disconnect according to claim 13, wherein the slot includes a keyway for retaining the pin, so that the compression sleeve is retained in a retracted position to permit the finger of the hinge latch to freely pivot.

* * * * *